United States Patent
Kim et al.

(10) Patent No.: US 11,189,885 B2
(45) Date of Patent: Nov. 30, 2021

(54) SEPARATOR INCLUDING BINDERS HAVING DIFFERENT GLASS TRANSITION TEMPERATURES AND METHOD OF MANUFACTURING THE SAME

(71) Applicant: LG CHEM, LTD., Seoul (KR)

(72) Inventors: Myeong Soo Kim, Daejeon (KR); Su Jin Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 82 days.

(21) Appl. No.: 16/611,685

(22) PCT Filed: Dec. 18, 2018

(86) PCT No.: PCT/KR2018/016116
§ 371 (c)(1),
(2) Date: Nov. 7, 2019

(87) PCT Pub. No.: WO2019/135510
PCT Pub. Date: Jul. 11, 2019

(65) Prior Publication Data
US 2020/0152945 A1    May 14, 2020

(30) Foreign Application Priority Data
Jan. 5, 2018 (KR) .................. 10-2018-0001881

(51) Int. Cl.
H01M 50/449 (2021.01)
H01M 10/0525 (2010.01)
H01M 50/403 (2021.01)
H01M 50/411 (2021.01)
H01M 50/446 (2021.01)

(52) U.S. Cl.
CPC ..... *H01M 50/449* (2021.01); *H01M 10/0525* (2013.01); *H01M 50/403* (2021.01); *H01M 50/411* (2021.01); *H01M 50/446* (2021.01)

(58) Field of Classification Search
CPC ............. H01M 50/449; H01M 50/403; H01M 50/446; H01M 50/411
USPC ........................................ 429/144, 251, 254
See application file for complete search history.

(56) References Cited

U.S. PATENT DOCUMENTS

| 7,662,517 | B2 | 2/2010 | Lee et al. |
| 10,153,473 | B2 | 12/2018 | Miyazawa et al. |
| 2009/0111025 | A1 | 4/2009 | Lee et al. |
| 2013/0084494 | A1 | 4/2013 | Furutani et al. |
| 2013/0280583 | A1* | 10/2013 | Lee ............... H01M 50/446 429/144 |
| 2015/0188108 | A1 | 7/2015 | Miyazawa et al. |
| 2015/0333308 | A1* | 11/2015 | Toyoda ........... H01M 50/461 429/144 |
| 2018/0097216 | A1 | 4/2018 | Joo et al. |
| 2018/0114968 | A1 | 4/2018 | Joo et al. |
| 2018/0166682 | A1 | 6/2018 | Lee et al. |

FOREIGN PATENT DOCUMENTS

| CN | 104521029 A | 4/2015 |
| CN | 107431165 A | 12/2017 |
| JP | 2016-72117 A | 5/2016 |
| KR | 10-2006-0072065 A | 6/2006 |
| KR | 10-2013-0092245 A | 8/2013 |
| KR | 10-2013-0136149 A | 12/2013 |
| KR | 10-2014-0055901 A | 5/2014 |
| KR | 10-2014-0124321 A | 10/2014 |
| KR | 10-2016-0118966 A | 10/2016 |
| KR | 10-2016-0118986 A | 10/2016 |
| KR | 10-2016-0127473 A | 11/2016 |
| KR | 10-2016-0146354 A | 12/2016 |
| KR | 10-2017-0093600 A | 8/2017 |
| KR | 10-2017-0112250 A | 10/2017 |
| KR | 20170112250 A * | 10/2017 |
| KR | 10-2017-0132349 A | 12/2017 |
| WO | WO 2013/151144 A1 | 10/2013 |
| WO | WO 2016/159724 A1 | 10/2016 |

OTHER PUBLICATIONS

Extended European Search Report for European Application No. 18898679.8, dated Apr. 29, 2020.
Fedelich "Application Handbook Thermal Analysis of Polymers Selected Applications Thermal Analysis" Jan. 2013, p. 1-40.
International Search Report issued in PCT/KR2018/016116 (PCT/ISA/210), dated Apr. 9, 2019.

* cited by examiner

*Primary Examiner* — Sean P Cullen
(74) *Attorney, Agent, or Firm* — Birch, Stewart, Kolasch & Birch, LLP

(57) ABSTRACT

A separator for secondary batteries, including a separator substrate having at least one surface, wherein the separator substrate comprises a polymer resin having a porous structure, a first coating layer on the separator substrate, the first coating layer includes a first inorganic material and a first binder, and a second coating layer on the first coating layer, the second coating layer includes a second inorganic material and a second binder, wherein the first coating layer further includes a third binder having a glass transition temperature lower than 30° C. and the second coating layer further includes a fourth binder having a glass transition temperature of 30° C. or higher.

12 Claims, No Drawings

SEPARATOR INCLUDING BINDERS HAVING DIFFERENT GLASS TRANSITION TEMPERATURES AND METHOD OF MANUFACTURING THE SAME

TECHNICAL FIELD

The present invention relates to a separator including binders having different glass transition temperatures, and more particularly to a separator for secondary batteries configured such that a first coating layer and a second coating layer coated on a separator substrate include different kinds of binders, wherein the first coating layer includes a binder having a glass transition temperature lower than 30° C. and the second coating layer includes a binder having a glass transition temperature of 30° C. or higher.

BACKGROUND ART

As portable devices, such as a portable computer, a mobile telephone, and a camera, have been increasingly developed and the demand for such portable devices has increased in recent years, the demand for secondary batteries as energy sources for such portable devices has also sharply increased. Among such secondary batteries is a lithium secondary battery having a high energy density, a high operating potential, a long lifespan, and a low self discharge rate, into which much research has been carried out and which is now commercialized and widely used.

With the increased concern about environmental problems, much research has been conducted on electric vehicles and hybrid electric vehicles, which are capable of replacing vehicles using fossil fuels, such as gasoline vehicles and diesel vehicles, which are one of the principal causes of air pollution. A lithium secondary battery is used for a power source for such electric vehicles and hybrid electric vehicles.

Accordingly, attempts to improve the safety of a lithium secondary battery having a high energy density have been continuously made.

In general, a separator includes a separator substrate and a coating layer coated on the separator substrate, and the physical properties of the separator may be determined depending on the composition of the coating layer.

Specifically, a coating layer having a single-layered structure may be formed on the separator substrate, or a coating layer having a multi-layered structure may be formed on the separator substrate. In the case in which a coating layer having a multi-layered structure is formed on the separator substrate, the layer that is adjacent to the separator substrate is configured to increase the peel strength of the coating layer from the separator, and the layer that faces an electrode is configured to increase the force of adhesion with an electrode mixture layer.

In the case in which the force of adhesion between the electrodes and the separator is low, a short circuit may occur between the electrodes as the result of the separator and the electrodes being pushed during charging and discharging of a battery. At this time, the battery may catch fire or explode due to the heat generated by excessive current locally flowing in the battery. In the case in which the force of adhesion between the electrodes and the separator is low, interfacial resistance may increase due to loosening between the electrodes, and therefore the electrodes may be bent, which causes a safety-related problem of the battery.

Patent Document 1 discloses a separator for power storage devices configured such that a porous layer, including a first resin binder having a glass transition temperature Tg of 30° C. or higher and a second resin binder having a glass transition temperature Tg lower than 30° C., is formed on a porous substrate layer.

Since the separator of Patent Document 1 has a structure in which a single-layered porous layer is formed on a separator substrate, however, the separator of Patent Document 1 exhibits higher thermal shrinkage and lower adhesive force than a separator having a structure in which a plurality of coating layers is formed on a separator substrate.

Patent Document 2 discloses technology for adjusting the content of inorganic particles and a binder polymer, as active layer components formed on the surface of a polyolefin-based separator substrate and/or in some of the pores in the separator substrate, in order to increase adhesive force.

Patent Document 2 does not disclose technology for increasing the peel strength and adhesive force of a separator, although Patent Document 2 discloses an effect related to thermal shrinkage and short-circuit stability of the separator.

As described above, an efficient solution to technology that is capable of increasing the peel strength between a separator substrate and a coating layer of a separator in order to prevent the coating layer from being separated from the separator substrate and that is capable of increasing the force of coupling between the coating layer of the separator and electrodes in order to prevent the occurrence of a short circuit between the electrodes due to the pushing or loosening of the separator has not yet been proposed.

RELATED ART DOCUMENT (Patent Document 1) Japanese Patent Application Publication No. 2016-072117
(Patent Document 2) Korean Patent Application Publication No. 2006-0072065

DISCLOSURE

Technical Problem

The present invention has been made in view of the above problems and other technical problems that have yet to be resolved, and it is an object of the present invention to provide a separator for secondary batteries configured such that a plurality of coating layers is coated on a separator substrate, wherein the first coating layer includes a binder having a glass transition temperature lower than 30° C. and the second coating layer includes a binder having a glass transition temperature of 30° C. or higher, whereby the peel strength from the separator substrate is increased and the force of adhesion to an electrode mixture layer is increased.

Technical Solution

In accordance with an aspect of the present invention, the above and other objects can be accomplished by the provision of a separator for secondary batteries, the separator including a separator substrate having at least one surface, wherein the separator substrate comprises a polymer resin having a porous structure, a first coating layer on the separator substrate, the first coating layer including a first inorganic material and a first binder, and a second coating layer on the first coating layer, the second coating layer including a second inorganic material and a second binder, wherein the first coating layer further includes a third binder having a glass transition temperature (Tg) lower than 30° C.

and the second coating layer further includes a fourth binder having a glass transition temperature (Tg) of 30° C. or higher.

The separator for secondary batteries according to the present invention includes a coating layer consisting of a first coating layer and a second coating layer. When compared with a separator configured such that a single coating layer is formed on a separator substrate, the separator for secondary batteries according to the present invention has advantages in that thermal shrinkage is low and in that the force of adhesion between the separator and an electrode is high.

The first coating layer, which is a layer coated on the separator substrate, has an effect on the peel strength from the separator, and the second coating layer, which is a layer coated on the first coating layer, has an effect on the force of adhesion to the electrode.

The first coating layer includes a third binder having a glass transition temperature lower than 30° C. The glass transition temperature of the third binder may be preferably 10° C. or lower, more preferably −5° C. or lower.

Since the first coating layer includes a third binder having a glass transition temperature lower than 30° C., as described above, binder particles may not be maintained in a circular form, the form of the binder particles may be indeterminate, and the binder particles may be mobile even at low temperatures, whereby a filming phenomenon may occur. Consequently, the force of coupling between the first coating layer and the raw material of the separator may be increased, whereby peeling strength may be increased.

The second coating layer includes a fourth binder having a glass transition temperature of 30° C. or higher. The glass transition temperature of the fourth binder may be preferably 45° C. or higher, more preferably 60° C. or higher.

Since the second coating layer includes a fourth binder having a glass transition temperature of 30° C. or higher, as described above, a filming phenomenon does not easily occur. In the case in which the fourth binder is used in the second coating layer, therefore, it is possible to solve a conventional problem in which the pores in the separator substrate are clogged, whereby the resistance of the separator is increased.

In a concrete example, the first inorganic material may be a principal component of the first coating layer, and the second binder may be a principal component of the second coating layer.

That is, the first coating layer includes the inorganic material, rather than the binder, as a principal component thereof. The inorganic particles may form interstitial volumes therebetween, and thus may form micropores, and also serve as a kind of spacer for maintaining the physical shape of the first coating layer. In addition, the physical characteristics of the inorganic particles are not generally changed even at a high temperature of 200° C. or higher, whereby the organic/inorganic composite porous film that is formed exhibits high heat resistance.

The inorganic particles are not particularly restricted, as long as the inorganic particles are electrochemically stable. That is, the inorganic particles that can be used in the present invention are not particularly restricted, as long as the inorganic particles are not oxidized and/or reduced within the operating voltage range (e.g. 0 to 5 V based on Li/Li+) of a battery to which the inorganic particles are applied. Particularly, in the case in which inorganic particles having ion transfer ability are used, ion conductivity in an electrochemical device may be increased, whereby it is possible to improve the performance of the electrochemical device.

Consequently, it is preferable for the ion transfer ability of the inorganic particles to be as high as possible. Also, in the case in which the inorganic particles have high density, it may be difficult to disperse the inorganic particles at the time of coating, and the weight of a battery may increase at the time of manufacturing the battery. For these reasons, it is preferable for the density of the inorganic particles to be as low as possible. Furthermore, in the case in which the inorganic particles have high permittivity, the degree of dissociation of electrolyte salt, such as lithium salt, in a liquid electrolyte may increase, whereby it is possible to improve the ion conductivity of the electrolytic solution.

The first inorganic material and the second inorganic material may be identical to or different from each other, and each of the first inorganic material and the second inorganic material may be at least one selected from the group consisting of (a) inorganic particles having a dielectric constant of 5 or higher, (b) inorganic particles having piezoelectricity, and (c) inorganic particles having lithium ion transfer ability.

Each of the first inorganic material and the second inorganic material may be high-permittivity inorganic particles having a dielectric constant of 5 or higher, preferably 10 or higher, such as $SrTiO_3$, $SnO_2$, $CeO_2$, $MgO$, $NiO$, $CaO$, $ZnO$, $ZrO_2$, $Y_2O_3$, $Al_2O_3$, $TiO_2$, or $SiC$.

The inorganic particles having piezoelectricity are a material that is a nonconductor at normal pressure but, when a predetermined pressure is applied thereto, exhibits conductivity due to a change in the internal structure thereof. The inorganic particles exhibit high dielectric characteristics having a dielectric constant of 100 or higher. In addition, when the inorganic particles are tensioned or compressed with a predetermined pressure, electric charges are generated. One face is charged as a positive pole and the other face is charged as a negative pole, whereby a potential difference is generated between the two faces.

The inorganic particles having piezoelectricity may form a potential difference due to positive charges and negative charges generated between opposite surfaces of the particles when a predetermined pressure is applied thereto, and may be at least one selected from the group consisting of $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, SiC, and a mixture thereof.

The inorganic particles having lithium ion transfer ability are inorganic particles that contain lithium elements and transport lithium ions without storing lithium. The inorganic particles having lithium ion transfer ability may transfer and transport lithium ions due to a kind of defect present in a particle structure. Consequently, the lithium ionic conductivity of the battery may be improved, and therefore the battery performance may be improved.

The inorganic particles having lithium ion transfer ability may contain lithium elements and may transport lithium ions without storing lithium, and may be at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$), such as $14Li_2O$-$9Al_2O_3$-$38TiO_2$-$39P_2O_5$ lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—

SiS$_2$, P$_2$S$_5$-based glass (Li$_x$P$_y$S$_z$, 0<x<3, 0<y<3, 0<z<7), such as LiI—Li$_2$S—P$_2$S$_5$, and a mixture thereof.

The first binder and the second binder may be identical to or different from each other, and, for example, each of the first binder and the second binder may be independently at least one selected from the group consisting of polyvinylidenefluoride-co-hexafluoropropylene, polyvinylidene fluorideco-trichloroethylene, polymethylmethacrylate, polyacrylonitrile, polyvinylpyrrolidone, polyvinylacetate, polyethylene-co-vinylacetate, polyimide, polyethyleneoxide, cellulose acetate, celluloseacetatebutyrate, celluloseacetatepropionate, cyanoethylpullulan, cyanoethylpolyvinylalcohol, cyanoethylcellulose, cyanoethylsucrose, pullulan, carboxylmethylcellulose, and polyvinylalcohol.

The first inorganic material, which is the principal component of the first coating layer, may be included in an amount of 50 weight % to 99 weight %, preferably 60 weight % to 95 weight %, based on a total solid mass of the first coating layer.

In the case in which the content of the first inorganic material is less than 50 weight % of the total solid mass of the first coating layer, it is difficult to maintain the physical shape of the first coating layer, and the heat resistance of the first coating layer may be reduced, which is undesirable. In the case in which the content of the first inorganic material is greater than 99 weight % of the total solid mass of the first coating layer, the force of coupling between the inorganic materials and the force of coupling between the inorganic material and the separator substrate may be reduced, since the content of the binder is too small, which is also undesirable.

The second binder, which is the principal component of the second coating layer, may be included so as to account for 50 weight % to 100 weight %, preferably 60 weight % to 95 weight %, based on a total solid mass of the second coating layer.

In the case in which the content of the second binder is less than 50 weight % of the total solid mass of the second coating layer, the force of adhesion between the second coating layer and the electrode may be reduced, which is undesirable.

The separator substrate may be a composite porous separator substrate having a uniformly formed porous structure. Consequently, it is possible to provide a separator configured such that lithium ions smoothly move through the pores and having a high rate of electrolytic solution impregnation.

The material for the separator substrate is not particularly restricted. For example, the separator substrate may be made of at least one selected from the group consisting of high-density polyethylene, low-density polyethylene, linear low-density polyethylene, ultrahigh-molecular-weight polyethylene, and polypropylene.

In accordance with another aspect of the present invention, there is provided a method of manufacturing the separator for secondary batteries.

In a concrete example, the separator for secondary batteries may be manufactured using a method including (a) preparing a separator substrate made of a polymer resin having a porous structure, (b) forming a first coating layer on the separator substrate, (c) drying the first coating layer, (d) forming a second coating layer on the first coating layer, and (e) drying the second coating layer.

In the separator, which is manufactured through the steps of forming the first coating layer on the separator substrate, drying the first coating layer, forming the second coating layer on the first coating layer, and drying the second coating layer, as described above, a boundary is formed between the first coating layer and the second coating layer, whereby a coating layer having a multi-layered structure is formed. Consequently, the physical properties of each of the first coating layer and the second coating layer may be maximally exhibited, whereby it is possible to manufacture a separator having high peel strength and adhesive force.

In accordance with other aspects of the present invention, there are provided a secondary battery including the separator for secondary batteries and a battery pack including the secondary battery as a unit battery.

Specifically, the battery pack may be used as a power source for a device requiring the ability to withstand high temperatures, a long lifespan, high rate characteristics, etc. Specific examples of the device may include a mobile electronic device, a wearable electronic device, a power tool driven by a battery-powered motor; an electric automobile, such as an electric vehicle (EV), a hybrid electric vehicle (HEV), or a plug-in hybrid electric vehicle (PHEV); an electric two-wheeled vehicle, such as an electric bicycle (E-bike) or an electric scooter (E-scooter); an electric golf cart; and an energy storage system. However, the present invention is not limited thereto.

The structure and manufacturing method of the device are well known in the art to which the present invention pertains, and thus a detailed description thereof will be omitted.

BEST MODE

Hereinafter, the present invention will be described with reference to the following example; however, this example should not be construed as limiting the scope of the present invention.

EXAMPLE 1

5 g of an acrylic-based polymer binder (a binder having a Tg of −5° C.) and 95 g of Al$_2$O$_3$, as an inorganic material, are dispersed in water in order to prepare a first coating layer slurry.

100 g of an acrylic-based polymer binder (a binder having a Tg of 60° C.) is dispersed in water in order to prepare a second coating layer slurry.

The first coating layer slurry is coated on a separator substrate made of a porous polypropylene material and is then dried at 25° C. for 1 hour in order to form a first coating layer. Subsequently, the second coating layer slurry is coated on the first coating layer and is then dried at 25° C. for 1 hour in order to form a second coating layer.

COMPARATIVE EXAMPLE 1

5 g of an acrylic-based polymer binder (a binder having a Tg of −5° C.) and 95 g of Al$_2$O$_3$, as an inorganic material, are dispersed in water in order to prepare a first coating layer slurry.

100 g of an acrylic-based polymer binder (a binder having a Tg of −5° C.) is dispersed in water in order to prepare a second coating layer slurry.

The first coating layer slurry is coated on a separator substrate made of a porous polypropylene material and is then dried at 25° C. for 1 hour in order to form a first coating layer. Subsequently, the second coating layer slurry is coated on the first coating layer and is then dried at 25° C. for 1 hour in order to form a second coating layer.

COMPARATIVE EXAMPLE 2

5 g of an acrylic-based polymer binder (a binder having a Tg of 60° C.) and 95 g of Al$_2$O$_3$, as an inorganic material, are dispersed in water in order to prepare a first coating layer slurry. 100 g of an acrylic-based polymer binder (a binder having a Tg of 60° C.) is dispersed in water in order to prepare a second coating layer slurry.

The first coating layer slurry is coated on a separator substrate made of a porous polypropylene material and is then dried at 25° C. for 1 hour in order to form a first coating layer. Subsequently, the second coating layer slurry is coated on the first coating layer and is then dried at 25° C. for 1 hour in order to form a second coating layer.

COMPARATIVE EXAMPLE 3

5 g of an acrylic-based polymer binder (a binder having a Tg of 60° C.) and 95 g of $Al_2O_3$, as an inorganic material, are dispersed in water in order to prepare a first coating layer slurry.

100 g of an acrylic-based polymer binder (a binder having a Tg of −5° C.) is dispersed in water in order to prepare a second coating layer slurry.

The first coating layer slurry is coated on a separator substrate made of a porous polypropylene material and is then dried at 25° C. for 1 hour in order to form a first coating layer. Subsequently, the second coating layer slurry is coated on the first coating layer and is then dried at 25° C. for 1 hour in order to form a second coating layer.

COMPARATIVE EXAMPLE 4

A first coating layer slurry and a second coating layer slurry are prepared in the same manner as in Example 1.

The first coating layer slurry is coated on a separator substrate made of a porous polypropylene material, the second coating layer slurry is coated on the first coating layer slurry, and the first coating layer slurry and the second coating layer slurry are dried at 25° C. for 1 hour in order to form a separator.

Measurement of Peel Strength

In order to measure the electrode adhesive force of each of the separators manufactured according to Example 1 and Comparative Example 1 to Comparative Example 4, a load of 8.5 MPa is applied to a negative electrode and each of the separators at 90° C. using a flat press in order to manufacture an electrode adhesive force measurement sample. A method of sequentially attaching a double-sided adhesive tape and the electrode adhesive force measurement sample to a slide glass and pulling one end of the separator at 180° to measure the force of the separator was used.

The measured peel strength is shown in Table 1 below.

Measurement of Electrode Adhesive Force

In order to measure the peel strength of each of the separators manufactured according to Example 1 and Comparative Example 1 to Comparative Example 4, a load of 8.5 MPa is applied to a negative electrode and each of the separators at 90° C. using a flat press in order to manufacture an electrode adhesive force measurement sample. A method of sequentially attaching a double-sided adhesive tape and the electrode adhesive force measurement sample to a slide glass and pulling one end of the separator at 180° to measure the force of the separator was used.

The measured electrode adhesive force is shown in Table 1 below.

TABLE 1

|   | Peel strength (gf/15 mm) | Electrode adhesive force (gf/15 mm) |
|---|---|---|
| Example 1 | 50 | 12 |
| Comparative Example 1 | 40 | 7 |
| Comparative Example 2 | 2 | 0 |
| Comparative Example 3 | 5 | 1 |
| Comparative Example 4 | 10 | 19 |

Referring to Table 1 above, each of Example 1 and Comparative Example 1, in which a binder having a Tg of −5° C. is used in the first coating layer, has high peel strength from a raw material. Each of Comparative Example 2 and Comparative Example 3, in which a binder having a Tg of 60° C. is used in the first coating layer, has much lower peel strength than Example 1 and Comparative Example 1. In addition, Example 1, in which a binder having a Tg of 60° C. is used in the second coating layer, has higher electrode adhesive force than Comparative Example 1, in which a binder having a Tg of −5° C. is used in the second coating layer, whereas the measured electrode adhesive force of Comparative Example 2 and Comparative Example 3 is also low since the peel strength of Comparative Example 2 and Comparative Example 3 is low. The electrode adhesive force of Comparative Example 4, in which the slurries are simultaneously coated in order to form a single layer, increases slightly, but the measured peel strength of Comparative Example 4 is very low.

Consequently, it can be seen that, in the case in which a binder having a Tg lower than 30° C. is used in the first coating layer and a binder having a Tg of 30° C. or higher is used in the second coating layer, it is possible to obtain the effect in which both peel strength and electrode adhesive force are increased.

Those skilled in the art to which the present invention pertains will appreciate that various applications and modifications are possible based on the above description without departing from the scope of the present invention.

INDUSTRIAL APPLICABILITY

As is apparent from the above description, a separator for secondary batteries according to the present invention is configured such that a first coating layer and a second coating layer are formed on a separator substrate, wherein the first coating layer includes a binder having a glass transition temperature Tg lower than 30° C. and the second coating layer includes a binder having a glass transition temperature of 30° C. or higher. Since a separator for secondary batteries including a multi-layered coating layer is used, as described above, it is possible to provide a coating layer having increased peel strength from the separator substrate, whereby it is possible to prevent separation or loosening of the coating layer.

In addition, the adhesive force between the separator and electrodes is increased. Consequently, it is possible to effectively prevent the occurrence of a short circuit between the electrodes due to charging and discharging of a battery cell, thereby further improving the safety of the battery cell.

The invention claimed is:

1. A separator for secondary batteries, comprising:
   a separator substrate having at least one surface, wherein the separator substrate comprises a polymer resin having a porous structure;
   a first coating layer on the separator substrate, wherein the first coating layer comprises a first inorganic material and a first binder, and the first binder having a glass transition temperature (Tg) lower than 30° C.; and
   a second coating layer on the first coating layer, wherein the second coating layer comprises a second inorganic material and a second binder, and the second binder having a glass transition temperature (Tg) of 60° C. or higher,
   wherein the first binder and the second binder have the same polymer with different Tg.

2. The separator for secondary batteries according to claim 1, wherein the separator substrate comprises at least one selected from a group consisting of high-density polyethylene, low-density polyethylene, linear low-density polyethylene, ultrahigh-molecular-weight polyethylene, and polypropylene.

3. The separator for secondary batteries according to claim 1, wherein the second binder is present in an amount of 50 weight % to 95 weight % based on a total solid mass of the second coating layer.

4. The separator for secondary batteries according to claim 1, wherein the first binder and the second binder are both an acrylic-based polymer binder.

5. The separator for secondary batteries according to claim 1, wherein
   each of the first binder and the second binder is at least one selected from a group consisting of polyvinylidenefluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinylacetate, polyimide, polyethyleneoxide, cellulose acetate, celluloseacetatebutyrate, celluloseacetatepropionate, cyanoethylpullulan, cyanoethylpolyvinylalcohol, cyanoethylcellulose, cyanoethyl sucrose, pullulan, carboxylmethylcellulose, and polyvinylalcohol.

6. The separator for secondary batteries according to claim 1, wherein the first inorganic material and the second inorganic material are identical material.

7. The separator for secondary batteries according to claim 1, wherein the first inorganic material is present in an amount of 50 weight % to 99 weight % based on a total solid mass of the first coating layer.

8. The separator for secondary batteries according to claim 1, wherein
   the first inorganic material and the second inorganic material are identical to or different from each other, and
   each of the first inorganic material and the second inorganic material is independently at least one selected from a group consisting of (a) inorganic particles having a dielectric constant of 5 or higher, (b) inorganic particles having piezoelectricity, and (c) inorganic particles having lithium ion transfer ability.

9. The separator for secondary batteries according to claim 8, wherein
   the inorganic particles having a dielectric constant of 5 or higher (a) are $SrTiO_3$, $SnO_2$, $CeO_2$, MgO, NiO, CaO, ZnO, $ZrO_2$, $Y_2O_3$, $Al_2O_3$, $TiO_2$, or SiC,
   the inorganic particles having piezoelectricity (b) form a potential difference due to positive charges and negative charges generated between opposite surfaces of the particles when a predetermined pressure is applied thereto, and are at least one selected from a group consisting of $BaTiO_3$, $Pb(Zr,Ti)O_3$ (PZT), PLZT, $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof, and
   the inorganic particles having lithium ion transfer ability (c) contain lithium elements and transport lithium ions without storing lithium, and are at least one selected from a group consisting of lithium phosphate, lithium titanium phosphate of formula $Li_xTi_y(PO_4)_3$, where $0<x<2$ and $0<y<3$, lithium aluminum titanium phosphate of formula $Li_xAl_yTi_z(PO_4)_3$, where $0<x<2$, $0<y<1$, and $0<z<3$, $(LiAlTiP)_xO_y$-based glass where $0<x<4$ and $0<y<13$, lithium lanthanum titanate of formula $Li_xLa_yTiO_3$, where $0<x<2$ and $0<y<3$, lithium germanium thiophosphate of formula $Li_xGe_yP_zS_w$, where $0<x<4$, $0<y<1$, $0<z<1$, and $0<w<5$, lithium nitride of formula $Li_xN_y$, where $0<x<4$ and $0<y<2$, $SiS_2$-based glass of formula $Li_xSi_yS_z$, where $0<x<3$, $0<y<2$, and $0<z<4$, $P_2S_5$-based glass of formula $Li_xP_yS_z$, where $0<x<3$, $0<y<3$, and $0<z<7$, and a mixture thereof.

10. The separator for secondary batteries according to claim 9,
    wherein the $(LiAlTiP)_xO_y$-based glass is $14Li_2O$-$9Al_2O_3$-$38TiO_2$-$39P_2O_5$, the lithium germanium thiophosphate is $Li_{3.25}Ge_{0.25}P_{0.75}S_4$, the lithium nitride is $Li_3N$, the $SiS_2$-based glass is $Li_3PO_4$—$Li_2S$—$SiS_2$ and the $P_2S_5$-based glass is LiI—$Li_2S$—$P_2S_5$.

11. A secondary battery comprising the separator according to claim 1.

12. A method of manufacturing the separator according to claim 1, the method comprising:
    (a) preparing the separator substrate;
    (b) forming the first coating layer on the separator substrate;
    (c) drying the first coating layer;
    (d) forming the second coating layer on the first coating layer; and
    (e) drying the second coating layer.

* * * * *